A. CORNELL.
MICROSCOPE AND TELESCOPE.
APPLICATION FILED MAR. 14, 1913.

1,128,761.

Patented Feb. 16, 1915.
2 SHEETS—SHEET 1.

A. CORNELL.
MICROSCOPE AND TELESCOPE.
APPLICATION FILED MAR. 14, 1913.

1,128,761.

Patented Feb. 16, 1915.

2 SHEETS—SHEET 2.

UNITED STATES PATENT OFFICE.

ALFRED CORNELL, OF TONBRIDGE, ENGLAND, ASSIGNOR TO FREDERICK NATHANIEL DAVIDSON, OF LONDON, ENGLAND.

MICROSCOPE AND TELESCOPE.

1,128,761. Specification of Letters Patent. Patented Feb. 16, 1915.

Application filed March 14, 1913. Serial No. 754,305.

*To all whom it may concern:*

Be it known that I, ALFRED CORNELL, a subject of the King of England, residing in Tonbridge, county of Kent, England, have invented certain new and useful Improvements in Microscopes and Telescopes, of which the following is a specification.

The present invention is for improvements in or relating to microscopes and telescopes and has for its object to provide for the adaptation of a microscope and its associated parts for use as a telescope.

One feature of the invention comprises the combination with a microscope having an eye piece and a stage, of a telescope tube having a telescope objective therein, said telescope tube being mounted on the microscope stage on the side remote from the microscope eye piece but in operative relation thereto.

Further features of the invention reside in the employment of a light-screening device, an improved arrangement of reflecting device, and means whereby the combined instrument may be adjusted in altitude and in azimuth.

Figure 3:
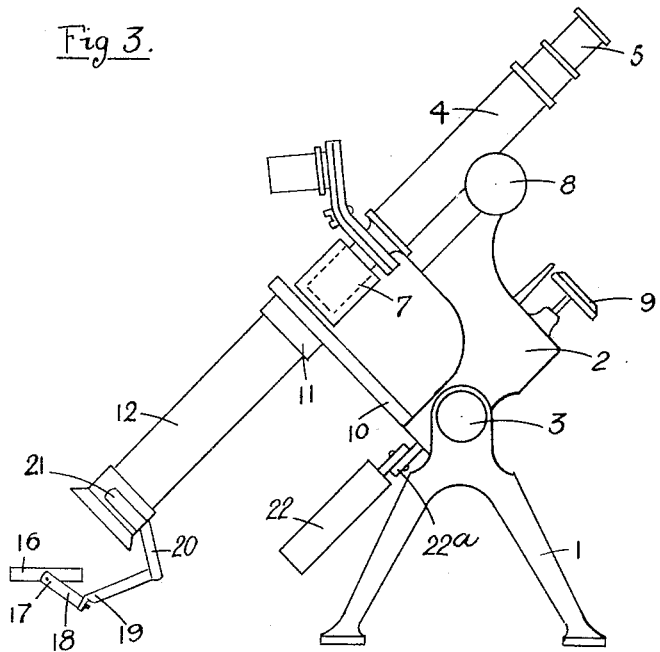
Figure 1:
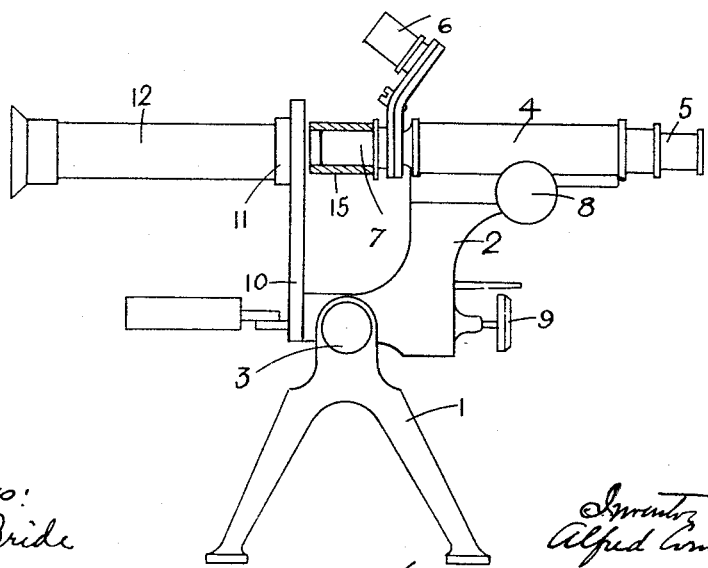
Figure 4:
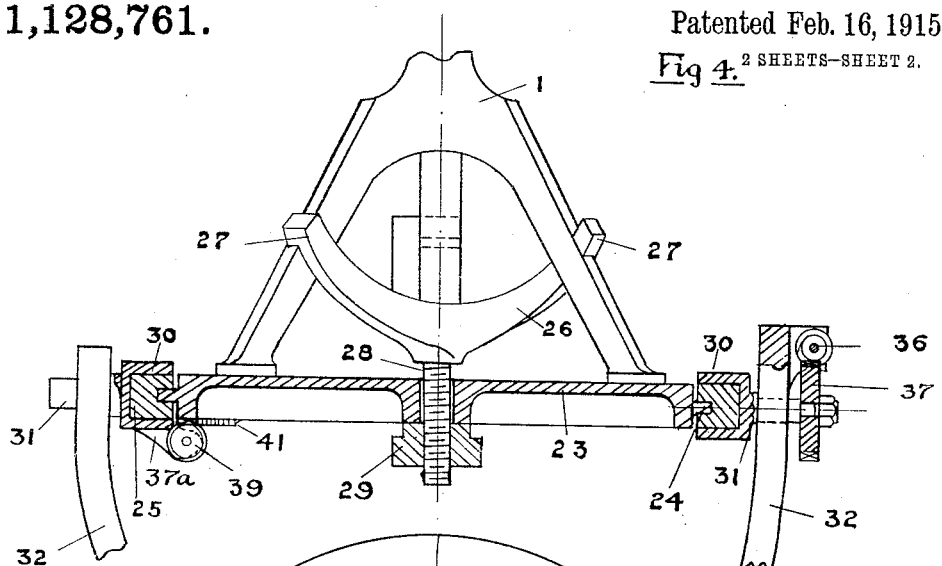
Figure 5:
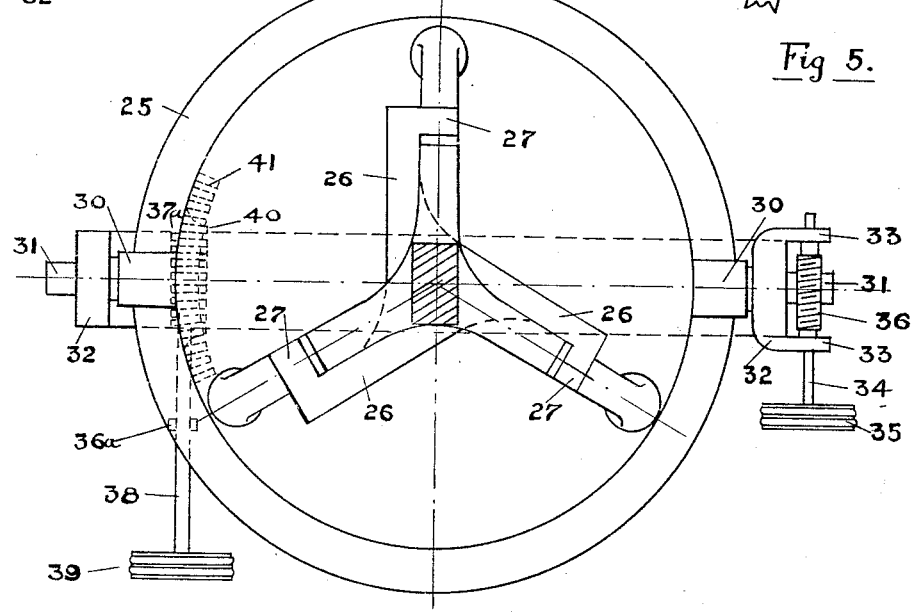
Figure 2:
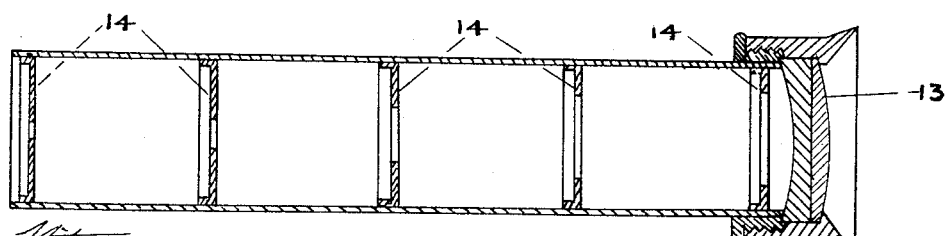

One embodiment of the invention is illustrated in the accompanying drawings, in which:

Figure 1 is an elevation of a microscope adapted for use as a telescope. Fig. 2 is a longitudinal section of the telescope attachment. Fig. 3 is another elevation of the microscope adapted for use as a telescope and illustrating the application of a reflector to the instrument. Fig. 4 is an elevation, partly in section, of parts of a support for the instrument, and Fig. 5 is a plan view of support shown in Fig. 4.

Like reference characters refer to like parts throughout the drawings.

Referring to Figs. 1 to 3 the tripod support of an ordinary microscope is indicated at 1 the mounting 2 being pivoted at 3 and supporting the microscope 4 which has an eye piece 5 and alternative objectives 6 and 7. The adjusting mechanism is shown at 8 and 9 and the stage at 10; the arrangement thus far described being well-known.

To adapt this microscope for use as a telescope a tube 12 carrying a telescope objective is inserted according to the present invention into an underfitting 11 on the stage 10. This tube 12 is shown clearly in Fig. 2 wherein also 13 indicates the objective and 14 a series of stops or diaphragms provided with apertures which diminish in diameter from the objective toward the underfitting 11. It is necessary that the objective 13 should be specially corrected achromatically if the best results are to be obtained.

The telescope attachment shown in Fig. 2 comprises a single tube only, but it may be constructed as a draw-tube, that is to say, with concentric sections, this construction of course being well-known and not needing any further description.

The operation of the device as thus far described is as follows:—The telescopic attachment is designed and arranged to produce a well-defined image in air at the focal plane of the microscope, that is to say in the central opening of the stage 10. This image is then viewed through the microscope which is adjusted in the usual way to bring the image into focus. In some circumstances the interval between the end of the objective 6 or 7 (whichever is in use) and the stage 10 is sufficient to allow external light to interfere with observation; in order to obviate this there is preferably provided a tube 15 which may be slipped over the micro-objective 6 or 7 to be used and then moved into contact with the stage 10 so as to exclude all external light. It should be pointed out that the stops 14 serve to produce a sharp image in the focal plane of the microscope, confusing light being intercepted. The focal angle, *i. e.* the angular aperture of the objective, is extreme, and the flatness of the field and wide angle of same are greater than that of an ordinary telescope having the same diameter of objective. A factor of great importance in securing these advantages is the fact that the corrections of the microscope, which as a whole acts as an eyepiece, are of a much higher order than those of an ordinary eyepiece of a telescope. The arrangement thus far described provides a combined microscope and telescope in the form of a small instrument which may be adjusted about a horizontal axis and which may also be adjusted for focusing purposes.

The observation of objects at high angles or near the zenith is much facilitated by the employment of a reflector such as that shown at 16. This reflector is mounted upon a pivot 17 carried by an arm 18 which is preferably pivoted so as to rotate about a vertical or substantially vertical axis at 19. The arm 18 is carried by a bracket 20 terminating in the form of a spring clip 21 adapted to fit the tube 12 of the telescope attachment. The spring clip 21 may be lined with baize or felt and adjusted in any position on the circumference of the tube 12. It will be seen on reference to Fig. 3 that objects overhead can be viewed quite comfortably while looking in a downward direction through the eyepiece of the microscope.

Instead of the reflector 16 being mounted on the bracket 20 it may be carried by an arm suitably shaped and pivoted either to the tail-piece 22 or to the stud 22ᵃ which carries this tail-piece in the ordinary microscope. Alternatively the reflector may be mounted upon an independent tripod stand in gimbals arranged in front of the microscope at the desired angle.

To facilitate observation by means of the combined microscope and telscope above described the tripod stand is preferably mounted on a support which can be adjusted angularly either mechanically or manually about two axes at right angles to each other i.e. in altitude and in azimuth. One suitable arrangement for effecting this is shown in Figs. 4 and 5 in which are shown the lower parts of the tripod 1 shown in Figs. 1 and 3. This tripod 1 is placed upon a supporting table 23 provided with an annular flange 24 fitting into a groove in an outer ring 25. At the center of the table or support 23 is arranged a spider 26 the arms of which are provided at their extremities with stops 27 which hook over or otherwise engage with the legs of the tripod 1. The shank 28 of the spider is screw-threaded and passes through the table 23 and a nut 29 is screwed on to the shank. When the tripod is placed in the position shown in Figs. 4 and 5 and the nut 29 is tightened the tripod 1 carrying the combined microscope and telescope will be securely locked to the table 23.

Secured to the ring 25 are straps 30 carrying pins or pivots 31 which are mounted in bearings in the forked arms 32 forming part of a rotatable support mounted upon a main tripod (see particularly Fig. 5). In addition to the table 23 being rotatable about a vertical axis the whole apparatus above described including the support 32 may also be rotated about a vertical axis (i.e. on the said main tripod). The arrangement also provides for rocking the microscope about a horizontal axis (i.e. on) the pins 31.

Where it is necessary to obtain fine angular adjustment either about a horizontal or a vertical axis this is preferably obtained in the following manner: For rocking the support about a horizontal axis one of the straps 30 is provided with a bracket 33 forming bearings for a rod 34 which carries a milled nut 35 and a worm 36. This worm meshes with a wheel 37 keyed to one of the pins 31 and by means of the nut 35 delicate adjustment about a horizontal axis can be obtained. Similarly the ring 25 and the strap 30 may be provided with brackets 36ᵃ and 37ᵃ respectively forming bearings for a rod 38 which carries a milled nut 39 and a worm 40. This worm meshes with teeth 41 on the underside of the table 23.

By this means delicate adjustment about a vertical axis can be obtained.

By fitting a camera lucida attachment to the eyepiece of the microscope the object may be viewed on the table 23 or an extension thereof.

When desired a lens or lenses adjustable or otherwise may be fitted in the stage 10 or underfitting 11 before or after the attachment of the telescope tube 12, and the device may be arranged so as to produce an inverted instead of an erect image.

One specific embodiment only of the present invention has been described and illustrated in the drawings as it is not deemed necessary to describe the various modifications which may be made without departing from the spirit of the invention.

What I claim as my invention and desire to secure by Letters Patent is:—

1. In an optical instrument, the combination with a microscope having an eye piece and a stage, of a tube, having a telescope objective therein, mounted on the microscope stage on the side remote from the microscope eye piece but in operative relation thereto.

2. An optical instrument comprising a microscope having an eye piece, an objective and a stage, means for screening the light from the space between the objective and the stage of the microscope, and a tube, having a telescope objective therein, mounted on the microscope stage on the side remote from the microscope eye piece but in operative relation thereto.

3. An optical instrument comprising a microscope having an eye piece, two alternative objectives, and a stage, a tube (15) for screening the light from the space between the objective and the stage of the microscope, and a tube, having a telescope objective therein, mounted on the microscope stage on the side remote from the microscope eye piece but in operative relation thereto.

4. An optical instrument comprising a microscope having an eye piece and a stage, a tube, having a telescope objective therein, mounted on the microscope stage on the side remote from the microscope eye piece but in operative relation thereto, a reflector mounted in operative relation to the telescope objective, and an adjustable support for the reflector mounted on the telescope tube.

5. The combination with a microscope having an eye piece and a stage, of a tube mounted on the microscope stage on the side remote from the microscope eye piece but in operative relation thereto, a telescope objective in said tube, and a plurality of apertured diaphragms within the tube and constituting a series the apertures of which increase progressively in diameter toward the said telescope objective.

6. An optical instrument comprising a microscope having an eye piece and a stage, a tube, having a telescope objective therein, mounted on the microscope stage on the side remote from the microscope eye piece but in operative relation thereto, and means for adjusting the microscope and telescope tube together in altitude and in azimuth.

7. An optical instrument comprising a microscope having an eye piece and a stage, a tube, having a telescope objective therein, mounted on the microscope stage on the side remote from a microscope eye piece but in operative relation thereto, a rotatable table supporting the microscope and telescope, mechanism for adjusting said table rotatably, a support for said table and its adjusting mechanism, pivots for said support lying perpendicular to the axis around which the table alone is rotatable, and mechanism for adjusting the position of said support on its pivots.

8. An optical instrument comprising a microscope having an eye piece and a stage, a tube, having a telescope objective therein, mounted on the microscope stage on the side remote from the microscope eye piece but in operative relation thereto, a rotatable table supporting the microscope and telescope, manually-operated worm and rack mechanism for adjusting said table rotatably, a support for said table and its adjusting mechanism, pivots for said support lying perpendicular to the axis around which the table alone is rotatable, and manually-operated worm and worm-wheel mechanism for adjusting the position of said support on its pivots.

In testimony whereof I have signed my name to this specification in the presence of two subscribing witnesses.

ALFRED CORNELL.

Witnesses:
HARRY B. BRIDGE,
PERCY HEWITT.

Copies of this patent may be obtained for five cents each, by addressing the "Commissioner of Patents, Washington, D. C."